May 17, 1966  W. E. MILLER  3,251,280

PISTON FOR WHEEL CYLINDERS AND THE LIKE

Filed March 21, 1958

INVENTOR.
WAYNE E. MILLER
BY
John A. Young
ATTORNEY

_United States Patent Office_ 3,251,280
Patented May 17, 1966

3,251,280
PISTON FOR WHEEL CYLINDERS AND THE LIKE
Wayne E. Miller, South Bend, Ind., assignor to The
Bendix Corporation, a corporation of Delaware
Filed Mar. 21, 1958, Ser. No. 723,049
5 Claims. (Cl. 92—222)

This invention relates to improvements in pistons or pressure transmitting devices for use in connection with hydraulic pressure transmission mechanisms.

At the present time, pistons for use in hydraulic wheel cylinders of the ordinary hydraulic brake system are commonly formed entirely of aluminum. This forming process consists in forging the metal to the desired shape and then grinding the outer surface of the piston to obtain a piston diameter which will conform closely to the inner diameter of the cylinder in which the piston is to be used. The use of aluminum pistons is highly desirable in cast iron cylinders from a corrosion standpoint, and also the use of aluminum lessens greatly the possibility of the piston scoring the cylinder wall. However, in order to resist the orders of force exerted by and on the piston, it is necessary to enlarge the quantity of aluminum in the piston base. This extra material requirement results in an increased cost of manufacture.

It is therefore one object of my invention to provide a simply constructed piston for use as described above which piston may be manufactured at a smaller quantity per unit to realize a reduced cost of manufacture.

It is a further object of my invention to provide a piston which is less expensive to manufacture while still retaining the desirable properties of an all aluminum piston.

Concurrently with the above objects it is an object of my invention to provide a piston which has at least equal strength to those presently used and having the usual aluminum reinforcement at the base thereof.

It is still a further object of my invention to provide an inexpensive process for making pistons for use as described above. The construction proposed in this invention is structurally simple and therefore opens many interesting possibilities for its manufacture, including the incorporation of stamping methods. I have therefore provided a piston which can be made at least partially by a stamping process, inasmuch as stamping is one of the best ways, from a standpoint of both expense and satisfaction, for forming or shaping metal parts. It will be appreciated that my piston has definite advantages from a manufacturing standpoint.

Other objects and advantages of my invention will be apparent from the following description wherein reference is made to the accompanying drawings.

Figure 1:
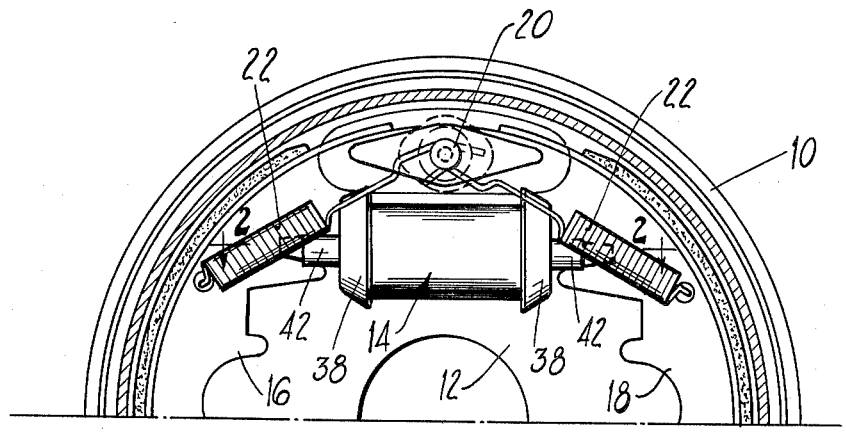
FIGURE 1 is a plan view of a part of a brake assembly showing brake shoes and a hydraulic wheel cylinder.

Referring now to FIGURE 1, there is shown a brake assembly comprising a drum 10, a backing plate 12, a hydraulic wheel cylinder 14 mounted on the backing plate 12, brake shoes 16 and 18 mounted on the backing plate 12 for actuation by the wheel cylinder 14, a fixed anchor 20 which is secured to the backing plate 12 and upon which the ends of the shoes 16 and 18 anchor during braking, and return springs 22 for normally holding the shoes in released position against the anchor 20.

Figure 2:
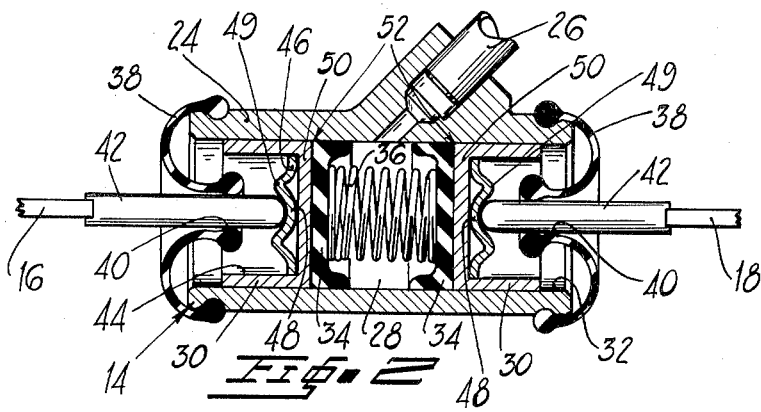
FIGURE 2 is a section taken through the hydraulic wheel cylinder on the line 2—2 of FIGURE 1.

In FIGURE 2, the hydraulic wheel cylinder 14 comprises a cast housing 24 having an inlet opening 26 which is connected to a source of hydraulic fluid pressure (not shown). The inlet 26 provides an opening for transmission of pressure fluid into chamber 28 in the housing interior. A pair of pistons, indicated generally by the reference numeral 30, are reciprocably mounted in the cylinder bore or cylinder wall 32 of the housing 24.

At the inner ends of the pistons 30 and facing toward the center of the chamber 28 are a pair of flexible sealing cups 34 which prevent the escape of hydraulic fluid from the chamber 28. The sealing cups 34 are yieldably held against the faces of the pistons 30 by a spring 36 which is compressed between the cups.

At opposite ends of the housing 24 are rubber boots 38 which are connected to the outer surface of the housing 24 and which serve to prevent the entry of foreign matter into the interior of the housing 24. An opening 40 is provided in each of the rubber boots to allow a pair of thrust links or force transmitting members 42 to interconnect each of the pistons 30 and the brake shoes 16 and 18.

In operation, fluid pressure from an operator controlled source (not shown) is introduced into the chamber 28 through the inlet opening 26. The fluid pressure acts to spread apart the pistons 30 and through the thrust links 42 a force is exerted on the brake shoes 16 and 18 to apply them into engagement with the drum 10 and thereby impede its rotation.

Figure 3:
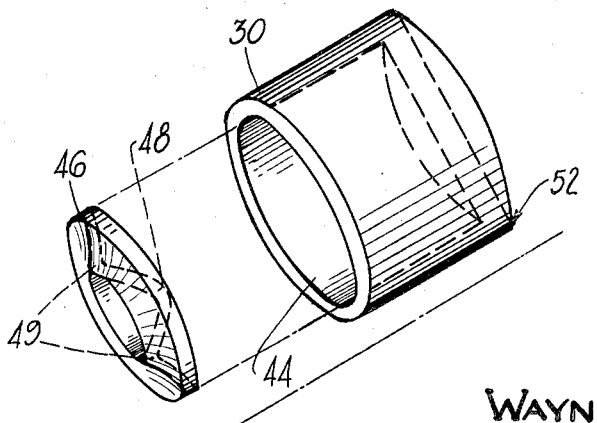
FIGURE 3 shows in perspective the hollow cylinder and the stamped insert which comprise the pistons shown in FIGURE 2.

Each of the piston devices comprises a hollow cylindrical member 44 of the general shape shown in FIGURE 3 which slidably engages the cylinder wall 32, and a stamped circular member or insert 46. The stamped circular member or insert 46 has a diameter slightly less than the inner diameter of the member 44. A depression 48 of semi-spherical or concave shape provides a socket in the insert 46 for receiving the rounded end of the thrust link 42. As shown in FIGURES 2 and 3, the entire outer portion encompassing the depression 48 is bent inwardly so that the outer edge of the circular member 46 is in substantially the same plane as the bottom of the depression 48. This forms a rib or ridge 49 surrounding the depression 48.

The hollow cylindrical member 44 is closed at one end to form a base portion 50. The member 44 may be formed by any of several well known methods. For example, the hollow member 44 may be formed by a cold forging process or by an impact extrusion process. It is desirable to have a sharp corner formed on the outer edge 52 of the base 50 of the hollow member 44, the base 50 being the portion adjacent the sealing cups 34. This is desirable in order that proper support may be given to the bottom edges of the sealing cups. If such support is not given, there is the danger that the cups will be pushed out of shape by the pressure of the fluid in the cylinder and the edges of the cups may become pinched between the piston and the cylinder wall.

In manufacturing the completed piston assembly, I propose the following method. The hollow member 44 is formed and the circular member or insert 46 is stamped from a flat sheet of metal. The forming of the depression 48 and the bending of the outer edges of the hollow member 44 may be done as separate steps or simultaneously with the stamping of the circular member from the flat metal sheet. When each of the two members 44 and 46 has been formed to its final shape, the insert 46 is then fitted into the inside of the hollow cylindrical member 44 as a "welch plug." In other words, the diameter of the insert 46 being slightly less than the inner diameter of the hollow member 44, the application of force to the insert 46 tending to flatten it will cause the outer edge of the insert 46 to grip the inner surface of the hollow member 44 thereby holding the two members securely together.

In the construction of my piston device, I prefer to make the hollow cylindrical member 44 from aluminum and to make the stamped insert 46 from steel. By so doing I realize substantial reduction in cost of the finished piston device over those presently used which are made entirely from aluminum. It should be noted that by using these materials there is no appreciable sacrifice in strength of the piston device. By making the hollow member 44 from aluminum and the insert 46 from steel I eliminate the corrosion problem which exists if the entire piston were made from steel and also eliminate the possibility of the piston scoring the cylinder wall. My invention also has the advantage that steel has better wear properties than does aluminum and therefore I obtain better wear characteristics between the thrust link 42 and the depression 48 in the insert 46.

It will be appreciated that I have provided a piston which may be readily and inexpensively formed while still maintaining the inherent advantage of having an aluminum surface which engages the inner wall of the cylinder and which has adequate strength to withstand the orders of force which are exerted by and on the piston during a breaking operation.

While the principles of my invention have been illustrated and described only in conjunction with a wheel cylinder for a conventional arcuate shoe type brake, it will be apparent to those skilled in the art that the principles of the invention are broad in scope and are capable of general application. It is intended that such revisions and variations of the invention as are reasonably expected on the part of those skilled in the art will be included within the scope of the following claims.

I claim:
1. A piston comprising a continuous cylindrical member, and a circular stamped member received entirely within said cylindrically shaped member and provided with a concave depression in the center thereof and a convex protrusion tangentially engaged with the base of said cylindrical member, the annular portion of said circular member encompassing said depression extending toward the closed end of said piston so that the outer edge of said member lies in the same plane as the bottom of the depression, the outer edge of said circular member gripping the inside surface of the cylindrically shaped member to hold the two members in assembled relation.

2. A piston comprising a hollow continuous cylindrical member having a closed base portion, a circular insert received in said cylindrical member and lying adjacent the base thereof, a concave-convex depression in the center of said insert which bears tangentially at its convex surface against the base of said cylindrical member, and an annular ridge surrounding said depression and concentric with the outer edge of said insert, said ridge being spaced from the base of said cylindrical member said outer edge of said insert gripping the inside surface of the cylindrically shaped member to hold the two members in assembled relation.

3. A piston comprising a hollow cylindrical member of aluminum, a disk-like member of steel having a central depression therein, said disk-like member having a ridge formed concentrically therein so that the inner portion of the crest of the ridge forms the wall of said depression and the outer portion of the crest forms a supporting ring for said disk-like member, said cylindrical member having a closed end, said disk-like member being located inside said cylindrical member with the inner portion of the crest forming the wall of the depression which rests on the central portion of said closed end and the outer portion of the crest forming the supporting ring which rests on the outer portion of said closed end, said disk-like member being in frictional engagement with the inner wall of said cylindrical member.

4. A piston comprising a hollow continuous cylindrical member having a closed base portion, a circular insert received in said cylindrical member and lying adjacent the base thereof, a concave-convex depression in the center of the insert which bears tangentially at its convex surface against the base of said cylindrical member, the outer edge of said insert gripping the inside surface of the cylindrically shaped member to hold the two members in assembled relation.

5. A hollow cylindrical member of metal, a disk-like member of a harder metal than said cylindrical member having a central depression therein, said disk-like member having a ridge formed concentrically therein so that the inner portion of the crest of the ridge forms the wall of said depression and the outer portion of the crest forms a supporting ring for said disk-like member, said cylindrical member having a closed end, said disk-like member being located inside said cylindrical member with the inner portion of the crest forming the wall of the depression which rests on the central portion of said closed end and the outer portion of the crest forming the supporting ring which rests on the outer portion of the closed end, said disk-like member being in frictional engagement with the inner wall of said cylindrical member.

References Cited by the Examiner

UNITED STATES PATENTS

| 801,683 | 10/1905 | Penfold | 29—522 |
| 1,752,982 | 4/1930 | Herold | 29—522 |
| 1,801,006 | 4/1931 | Jacoby | 29—522 |
| 2,308,875 | 1/1943 | Goepfrich | 309—4 |
| 2,596,298 | 5/1952 | Schreffler | 309—33 |
| 2,673,769 | 3/1954 | Morrison et al. | 309—4 |
| 2,776,735 | 1/1957 | Bancroft | 29—522 |

FOREIGN PATENTS 348,411   5/1937   Italy.

KARL J. ALBRECHT, *Primary Examiner.*

RALPH H. BRAUNER, *Examiner.*

J. LABOWSKI, R. B. SANCHEZ, *Assistant Examiners.*